United States Patent
Ratcliffe et al.

(10) Patent No.: US 12,505,425 B2
(45) Date of Patent: Dec. 23, 2025

(54) SYSTEM AND METHOD FOR IMPORTING ELECTRONIC CREDENTIALS WITH A THIRD-PARTY APPLICATION

(71) Applicant: Google LLC, Mountain View, CA (US)

(72) Inventors: Stephen John Ratcliffe, London (GB); Nicholas A. Hays, San Francisco, CA (US); Max Benjamin Christoff, Berkeley, CA (US); Prakash Prem Hariramani, Burlingame, CA (US)

(73) Assignee: GOOGLE LLC, Mountain View, CA (US)

( * ) Notice: Subject to any disclaimer, the term of this patent is extended or adjusted under 35 U.S.C. 154(b) by 341 days.

(21) Appl. No.: 17/088,217

(22) Filed: Nov. 3, 2020

(65) Prior Publication Data

US 2021/0133727 A1    May 6, 2021

Related U.S. Application Data

(60) Provisional application No. 62/930,424, filed on Nov. 4, 2019.

(51) Int. Cl.
| | |
|---|---|
| *G06Q 20/36* | (2012.01) |
| *G06F 9/54* | (2006.01) |
| *G06Q 20/04* | (2012.01) |
| *G06Q 20/10* | (2012.01) |
| *G06Q 20/32* | (2012.01) |
| *G06Q 20/34* | (2012.01) |
| *G06Q 20/38* | (2012.01) |
| *G06Q 40/02* | (2023.01) |
| *G06F 3/0484* | (2022.01) |

(52) U.S. Cl.
CPC ......... *G06Q 20/3672* (2013.01); *G06F 9/543* (2013.01); *G06Q 20/0457* (2013.01); *G06Q 20/108* (2013.01); *G06Q 20/3221* (2013.01); *G06Q 20/326* (2020.05); *G06Q 20/341* (2013.01); *G06Q 20/3821* (2013.01); *G06Q 40/02* (2013.01); *G06Q 40/023* (2025.08); *G06F 3/0484* (2013.01); *G06Q 20/3278* (2013.01)

(58) Field of Classification Search
CPC ... G06Q 20/40; G06F 3/0483; G06F 3/03547; G06F 3/0481
See application file for complete search history.

(56) References Cited

U.S. PATENT DOCUMENTS

| | | | | |
|---|---|---|---|---|
| 10,496,808 B2 * | 12/2019 | Van Os | ............... | G06F 3/048 |
| 2016/0232521 A1 * | 8/2016 | Sharp | ............... | G06Q 20/3229 |
| 2016/0358172 A1 * | 12/2016 | Ziat | ............... | G06Q 20/227 |

(Continued)

*Primary Examiner* — Calvin L Hewitt, II
*Assistant Examiner* — Amanulla Abdullaev
(74) *Attorney, Agent, or Firm* — DORITY & MANNING P.A.

(57) ABSTRACT

One example aspect of the present disclosure is directed to a computing system that includes at least one processor and at least one tangible, non-transitory computer-readable medium that stores instructions that, when executed by the at least one processor, cause the at least one processor to perform operations. The operations can include providing, for display in a user interface, data from an application and data that describes an electronic credential; receiving a user input that requests storing the electronic credential; and receiving via an application programming interface, data that describes the electronic credential.

16 Claims, 18 Drawing Sheets

(56) References Cited

U.S. PATENT DOCUMENTS

| | | | |
|---|---|---|---|
| 2018/0082282 A1* | 3/2018 | Van Os | G06Q 20/3674 |
| 2018/0218446 A1* | 8/2018 | Ries | G06Q 40/02 |
| 2019/0370805 A1* | 12/2019 | Van Os | H04W 12/06 |

* cited by examiner

FIG. 8

SYSTEM AND METHOD FOR IMPORTING ELECTRONIC CREDENTIALS WITH A THIRD-PARTY APPLICATION

PRIORITY CLAIM

The present application is based on and claims priority to U.S. Provisional Application 62/930,424 having a filing date of Nov. 4, 2019, which is incorporated by reference herein.

FIELD

The present disclosure relates generally to payment and identification systems. More particularly, the present disclosure relates to systems and methods for importing electronic credentials with a third party application.

BACKGROUND

Storing and using personal electronic credentials on mobile devices has recently become possible. Example personal electronic credentials include credit cards, debit cards, and identification cards. For example, near field communication (NFC) can be used to conduct a transaction using a credit card via a mobile device and NFC-compatible card reader without the physical credit card being present. Obtaining and storing such personal electronic credentials, however, can been tedious. For example, users can manually enter various details to generate a personal electronic credential, such as a card number, expiration date, CVV code, or the like.

SUMMARY

Aspects and advantages of embodiments of the present disclosure will be set forth in part in the following description, or can be learned from the description, or can be learned through practice of the embodiments.

One example aspect of the present disclosure is directed to a computing system that includes at least one processor and at least one tangible, non-transitory computer-readable medium that stores instructions that, when executed by the at least one processor, cause the at least one processor to perform operations. The operations can include providing, for display in a user interface, data from an application and data that describes an electronic credential; receiving a user input that requests storing the electronic credential; and receiving via an application programming interface, data that describes the electronic credential.

Another example aspect of the present disclosure is directed to a method for receiving data describing an electronic credential. The method can include providing, by one or more computing devices and for display in a user interface, data from an application and data that describes an electronic credential; receiving, by the one or more computing devices, a user input that requests storing the electronic credential; and receiving, by the one or more computing devices, via an application programming interface, data that describes the electronic credential.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIGS. 5 through 8 depict a series of sequential views of a user interface of the computing device, such as a desktop or laptop, in which data describing an electronic credential can be received via one or more APIs at a mobile computing device according to aspects of the present disclosure.

Figure 1:
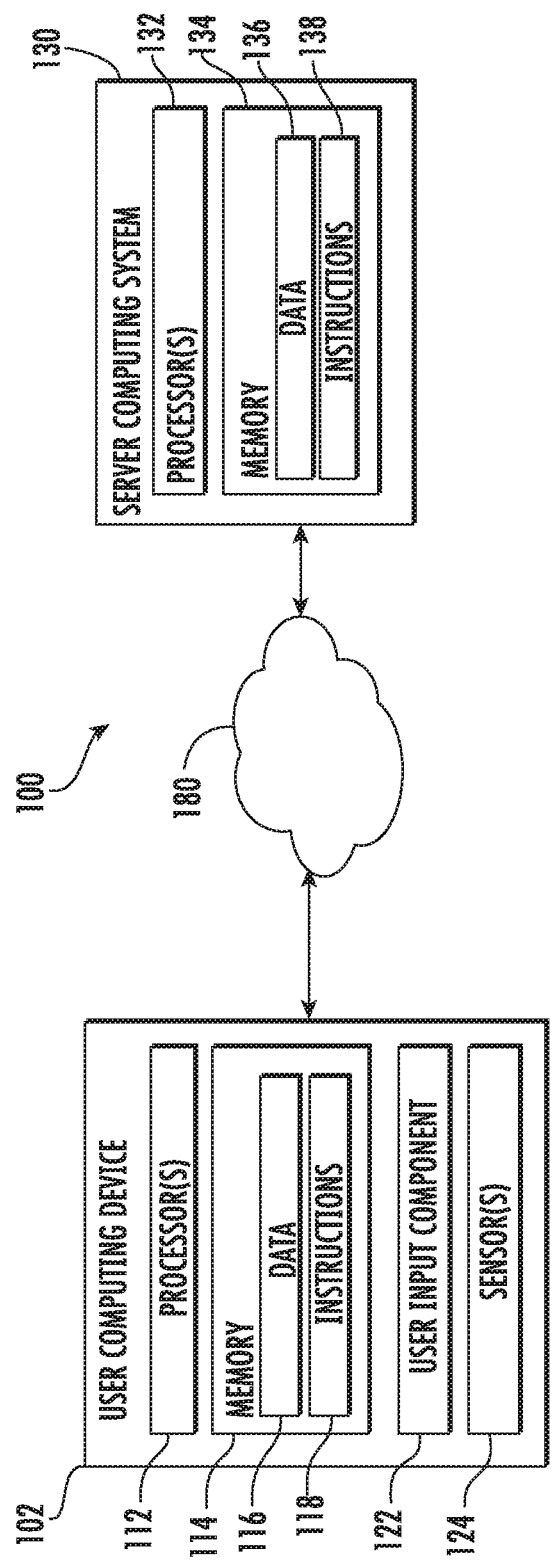
FIG. 1 depicts a block diagram of an example computing system according to example embodiments of the present disclosure.

Reference numerals that are repeated across plural figures are intended to identify the same features in various implementations.

DETAILED DESCRIPTION

Overview

Generally, the present disclosure is directed to systems and methods for obtaining or receiving data describing an electronic credential for storage. The systems and methods described herein can provide improved access to electronic credentials, such as boarding passes, tickets, credit cards, debit cards and the like. One or more application programming interfaces (APIs) can be leveraged to facilitate storing and/or manipulating of the electronic credentials, for example when viewing or interacting with electronic credentials in a third party application (e.g., a banking application, web browser application, and so forth). The electronic credentials can be stored in a local memory location of a mobile computing device and/or using a digital wallet service for later use. A user can access the electronic credentials from the digital wallet. For example, the user can access a credit card for completing a transaction using an electronic credential associated with the credit card via the mobile computing device (e.g., smartphone, tablet, or the like). The mobile computing device can use near field communication (NFC), Bluetooth, Wi-Fi, or other suitable types of communication to exchange information about the credit card to complete the transaction.

Currently, users often access electronic credentials on a mobile device using third party applications, for example, that are provided by distributors of electronic credentials. For instance, a flight boarding pass can be accessed through a computer application provided by the airline that issued the flight boarding pass. A credit card can be viewed or accessed using a mobile banking application provided by the issuer of the credit card. While accessing such electronic credentials, an API can be used to facilitate storing of one or more electronic credentials. For instance, an interactive object (e.g., button, slider, etc.) can be displayed through the API when an electronic credential (or information describing the electronic credential) is being displayed. The interactive object can provide the user with an option to store the electronic credential for later use. The user can provide an input that requests that the electronic credential be stored (e.g., by tapping or otherwise interacting with the interactive object). The electronic credential and/or data describing the electronic credential can be transmitted by the application and/or received via the API (e.g., at the mobile computing device). The electronic credential and/or data describing the electronic credential can be stored in a digital wallet service for later use.

The operations described herein can be performed across multiple computing devices. For example, a user can initiate the process of adding an electronic credential, such as a credit card, to their mobile device while using their laptop or desktop to access their bank's website. The user can then confirm or complete the process of adding the credit card to their mobile device on the mobile device itself. More specifically, a first computing device (e.g., a desktop computer, laptop computer, tablet, etc.) can display data from the application (e.g., a display window of the application) and data that describes the credit card (e.g., an image of the credit card). An API can be configured to interface with the third party application (e.g., web browser application) of the first computing device to provide the user with an option to add the credit card that is described or displayed by the first computing device to a second computing device (e.g., their mobile computing device) and/or digital wallet service. For example, an interactive object (e.g., a button, slider, or the like) can be displayed by the first computing device. The user can provide an input that requests that the electronic credential be sent to their mobile computing device and/or digital wallet service (e.g., an input that is directed to the interactive button). The data that describes the electronic credential can be received via the API at a second computing device (e.g., a mobile computing device) that is distinct from the first computing device (e.g., the desktop computer, laptop computer, tablet, etc.). For example, if the user requests that the card be stored at their mobile device, a tokenization of the credit card or debit card can be received at the user's mobile device via the API. The mobile device can store the tokenization in a local memory location of the mobile device.

As used herein "electronic credential," can refer to a variety of types of credentials and/or items. As discussed, above, the electronic credential can be or include payment credentials and/or accounts, such as credit cards, debit cards, bank accounts or the like. As an additional example, the electronic credential can be or include tickets and/or passes for events (e.g., concerts, shows, etc.) and/or transportation (airplane tickets, train tickets, etc.). As further examples, the electronic credentials can be or include membership rewards cards, public transit cards, or any other suitable personal electronic credentials.

As indicated above, data that describes the electronic credential can be displayed in the user interface. For example, an image of a credit card, debit card, boarding pass, transportation ticket (e.g., airplane ticket, train ticket, etc.), event ticket, or the like can be displayed. As further examples, a QR code, bar code, or other encoded visual symbol can be displayed. In some implementations, a name or identifying number or the like can be displayed. However, any suitable data that is descriptive of the electronic credential can be displayed.

Electronic credentials can be stored in response to a variety of user input. For example, as described above, electronic credentials and/or data describing the electronic credentials can be stored in response to a user input directed to an interactive button to a touch sensitive display screen. However, the electronic credentials can be stored in response to other input. For instance, a physical button or combination of physical buttons on the mobile device can be configured to store one or more electronic credentials. As another example, electronic credentials can be stored in response to a voice command.

In other implementations, electronic credentials can be stored automatically, if the user has so consented. For example, a user can consent to particular types of electronic credentials being automatically detected and/or stored. As the user accesses or obtains new electronic credentials, for example on their mobile device, the new electronic credentials can be automatically stored with the digital wallet service. For example, a user can apply for a new credit card and install a new banking application for the new credit card. If the user has so consented, when the user logs into the new banking application, the computing system can automatically store the credit card and/or a tokenization of the credit card in a local memory location of the mobile device and/or with the digital wallet service for later use by the user.

Furthermore, although described above as performed with one or more APIs, in some implementations, electronic credentials and/or data describing the electronic credentials can be stored without APIs or other integration of application providing the electronic credential. For example, the computing system can employ an operating system layer that is configured to identify electronic credentials that are suitable for storage in the digital wallet service. When such credentials are detected (e.g., as displayed in the user interface and/or as assessible through a computing application), the operating system layer can be configured to identify the electronic credential. The computing system can be configured to notify the user that the electronic credential is available for storage, for example, with an interactive object as described above. The computing system can be configured to extract information about the electronic credential from the information displayed in the user interface. For instance, the computing system can save the credit card numbers of a credit card displayed in a banking application. As another example, the computing system can automatically save a QR code and/or other data displayed that is associated with a boarding pass or ticket.

In some embodiments, additional steps and/or notifications may be employed to complete storage of electronic credentials for later use. For example, the user interface can present the user with terms of service, warranties, disclaimers, or the like. As another example, the computing device can require the user to enter information associated with the user and/or electronic credential, for example to confirm the user's identify, confirm that the user should have access to the electronic credential, and/or otherwise provide increased security.

Additional aspects of the present disclosure are directed to an application and/or operating-system layer that can be configured to provide a digital wallet interface for accessing and/or organizing electronic credentials. The electronic credentials can be automatically organized, for example by type. One or more financial electronic credentials (e.g., credit cards, debit cards, etc.) can be displayed in a first panel. The first panel can be scrollable in a first direction to display additional financial electronic credentials. Other types of electronic credentials (e.g., non-financial credentials) such as rewards, loyalty, and/or transit cards can be displayed in a second panel. The second panel can be scrollable in a second direction. The second direction can be perpendicular with the first direction.

Additionally, in some implementations, the digital wallet interface can include an "add" button for adding additional electronic credentials to the digital wallet service. The "add" button can provide the user with an option to manually import a credential (e.g., credit card, debit card, rewards card or the like), for example by manually entering information associated with the credential.

In some implementations, the digital wallet interface can be configured to display additional information associated with the electronic credentials. A user can select a particular electronic credential to view associated information. For instance, recent transactions or other details associated with a particular electronic credential (e.g., credit card) can be displayed. Additional example details can include, for example, a day and time of the transaction and/or a location of the transaction. Thus, the digital wallet interface can be configured to selectively provide the user with additional information about particular electronic credentials and/or past uses (e.g., transactions) of the electronic credentials.

In some implementations, the digital wallet interface can include a navigation bar. The navigation bar can provide categories of electronic credentials. Example categories include "Pay," "ID," "Passes," and "Keys." The user can navigate between respective categories of electronic credentials using the navigation bar. Electronic payment credentials, such as credit cards, debit cards, and the like can be accessed in the "Pay" category. Identification cards, such as passports, driver's licenses, and the like, can be accessed in the "ID" category. Boarding passes, tickets, and the like can be accessed in the "Passes" category. Lastly, one or more electronic keys, security videos and/or live streams, and/or other home-based security credentials and/or items can be accessed in the "Keys" category. In some implementations, the user can organize the electronic credentials and/or create custom categories for the electronic credentials.

Aspects of the present disclosure are directed to providing the user with introductory information (e.g., "onboarding" information) and/or the ability to easily setup their mobile device for use with the digital wallet service. For example, a prompt can be displayed that prompts the user to turn on NFC, wi-fi, Bluetooth, or the like, for example to facilitate use of tokenized credit cards and/or debit cards to make purchases. As another example, the computing device can prompt the user to adjust a setting with respect to the locking the screen of the mobile computing device. For instance, the mobile computing device can suggest that the user set adjust the settings such that the electronic payment credentials can only be used when the screen of the device is unlocked (e.g., using a passcode, biometric authentication, etc.) to improve security. As a further example, a prompt can be displayed suggesting that the user set the digital wallet service application as the user's default payment method. The various prompts and/or notifications described herein can also be used to educate and inform the user about the digital wallet service.

With reference now to the Figures, example embodiments of the present disclosure will be discussed in further detail.

EXAMPLE DEVICES AND SYSTEMS

FIG. 1 depicts a block diagram of an example computing system 100 for receiving data describing an electronic credential according to example embodiments of the present disclosure. The system 100 can include a user computing device 102 and a server computing system 130 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations. Electronic credentials and/or data describing electronic credentials can be stored in one more local memory locations of the user computing device 102. For example, the local memory location can correspond with the memory 114.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can enter a communication. The user computing device 102 can also include one or more sensors 124, such as microphones, cameras, temperature sensors, accelerometers, and the like.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Example Embodiments

Figure 2:
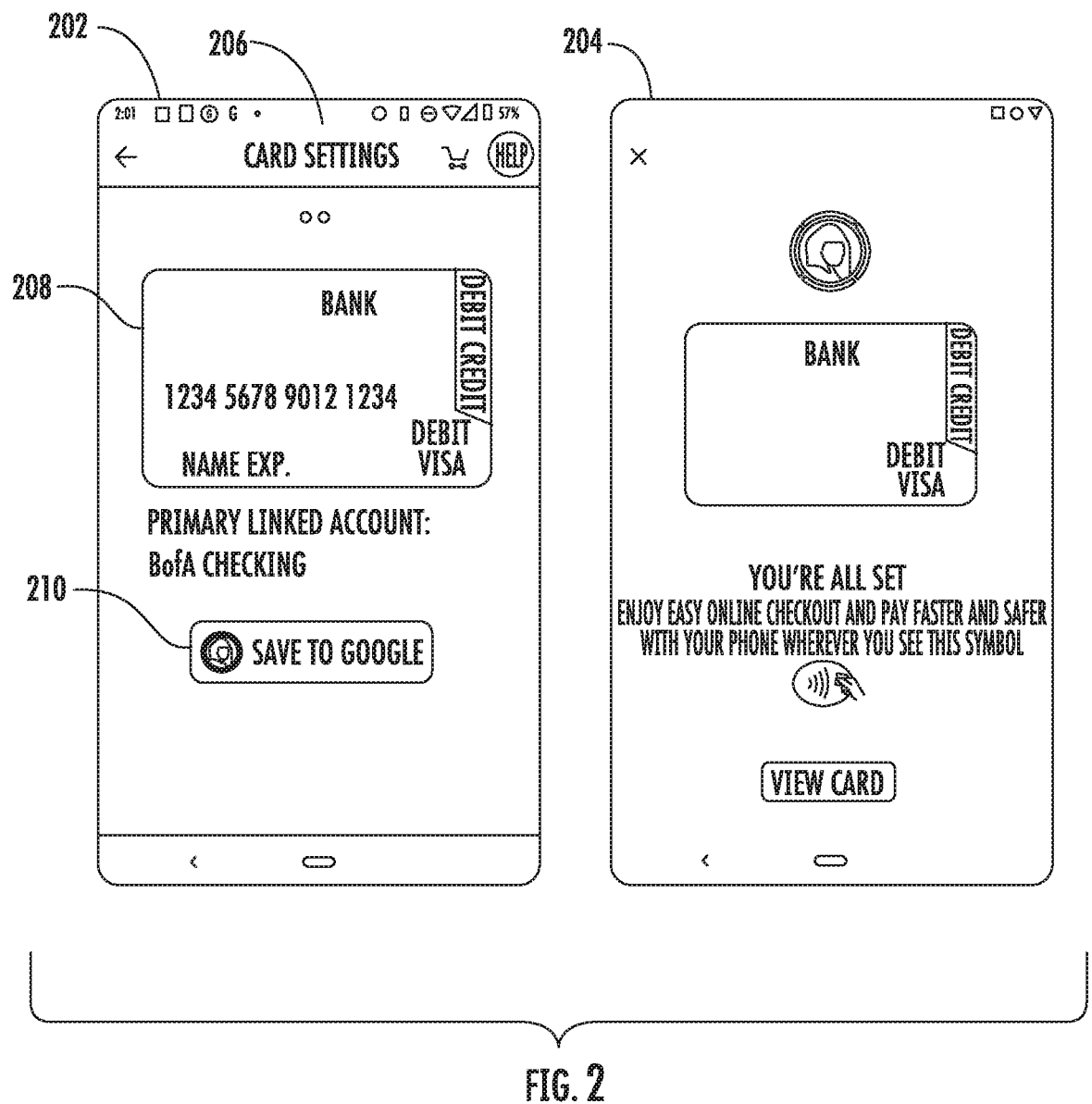
FIG. 2 depicts a series of example sequential views of a display of a mobile computing device that is configured to receive an electronic credential from a third party application according to aspects of the present disclosure.

FIG. 2 depicts a first view 202 and a second view 204 of a display of a mobile computing device according to aspects of the present disclosure. In the first view 202, a display window 206 of a banking application is provided. An output from the application can be displayed that describes an electronic credential 208 (e.g., a debit card).

A user input can be received that requests that the electronic credential 208 be stored, for example in a digital wallet service. An interactive object 210 can be displayed in the display window 206 of the banking application. The interactive object 210 can describe or suggest storing the electronic credential in the digital wallet service and/or at a local memory location of the computing devices. The interactive object 210 can be displayed via one or more APIs. For example, the application can be configured to display the interactive object 210 according to instructions, rules, or the like as defined in the API.

The data that describes the electronic credential 208 can be received via one or more APIs (e.g., from the application or from a separate source that is distinct from the application). For example, the format, size, encryption, and/or type of data or communication that the application sends can be defined by the API. For instance, the data can include a tokenized version of the electronic credential 208 (e.g., credit card) and/or additional information (e.g., credit card number, expiration date, CVV number, etc.).

The second view 204 of the display of the mobile computing device includes a confirmation that the electronic credential 208 has been stored (e.g., to a local memory location of the mobile computing device and/or electronic wallet) for later use.

Figure 3:
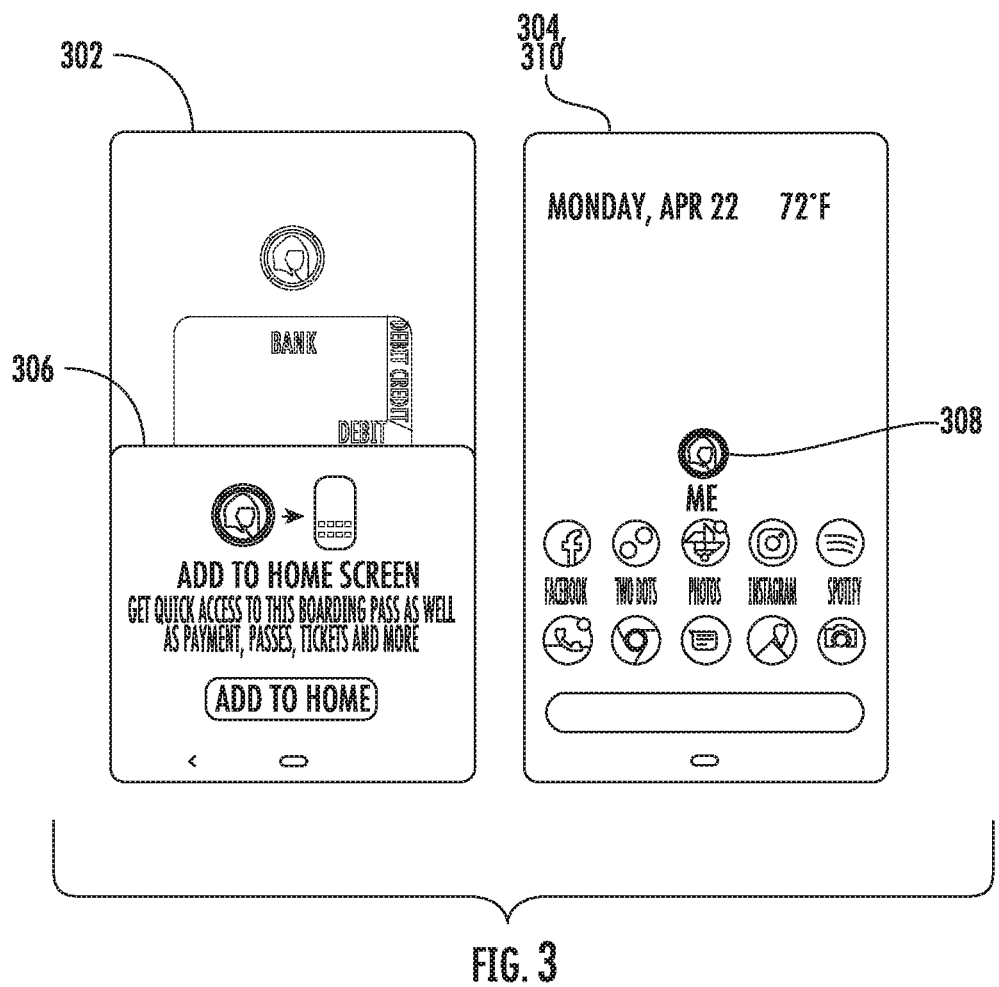
FIG. 3 depicts a series of example sequential views of a display of a mobile computing device after the electronic credential has been received from the third party application according to aspects of the present disclosure.

FIG. 3 depicts a third view 302 and a fourth view 304 of the display of the mobile computing device according to aspects of the present disclosure. Referring to the third view 302, a panel 306 can be displayed that provides the user with the option to add an icon 308 to a home screen 310 of the mobile computing device. The icon 308 can provide the user with access to an interface for the digital wallet, for example as described with reference to FIGS. 14-17.

Figure 4:
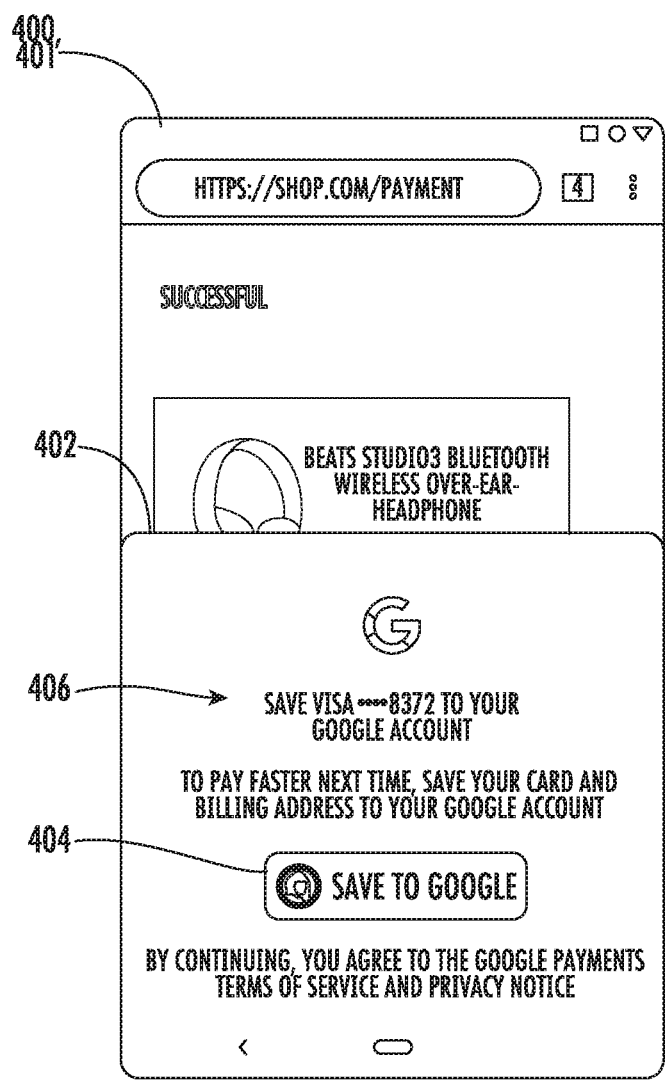
FIG. 4 depicts a view of a user interface of a mobile device in which a panel is displayed offering to save an electronic credential from a web browser application of a mobile device.

FIG. 4 depicts a view 400 of a user interface 401 of a mobile device. In this example, the user can complete a purchase using a web browser application in the user interface 401. The computing system (e.g., operating system) can interface with the web browser application to provide the user with an option to save the credit or debit card that was used to complete the purchase to a digital wallet and/or to a local memory location of the mobile computing device for later use.

More specifically, data from the web browser application (e.g., including order details) can be displayed in the user interface 401. The user can input their credit card information into the web browser application. Once the user completes the purchase, a panel 402 can be displayed including an interactive object 404, for example stating "Save to Google" with respect to data that describes the electronic credential 406.

One or more of the above functions can be performed or facilitated through one or more APIs. As one example, the data that describes the electronic credential 406 can be received via one or more APIs. The data that describes the electronic credential 406 can be received from the application and/or received from a source that is distinct from the application, such as a website, server, etc. The data can be received from a banking or payment website (e.g., from a Visa server, Mastercard server, or the like). The data can include a tokenized version of the electronic credential 406 and/or other information about the electronic credential 406. The API can facilitate transmission of the data that describes the electronic credential 406 from the application and/or from a source that is distinct from the application. As another example, display of the interactive object 404 can be facilitated via one or more APIs. The API can define when the interactive object 404 is displayed and/or one or more aspects of the appearance of the interactive object 404.

Figure 5:
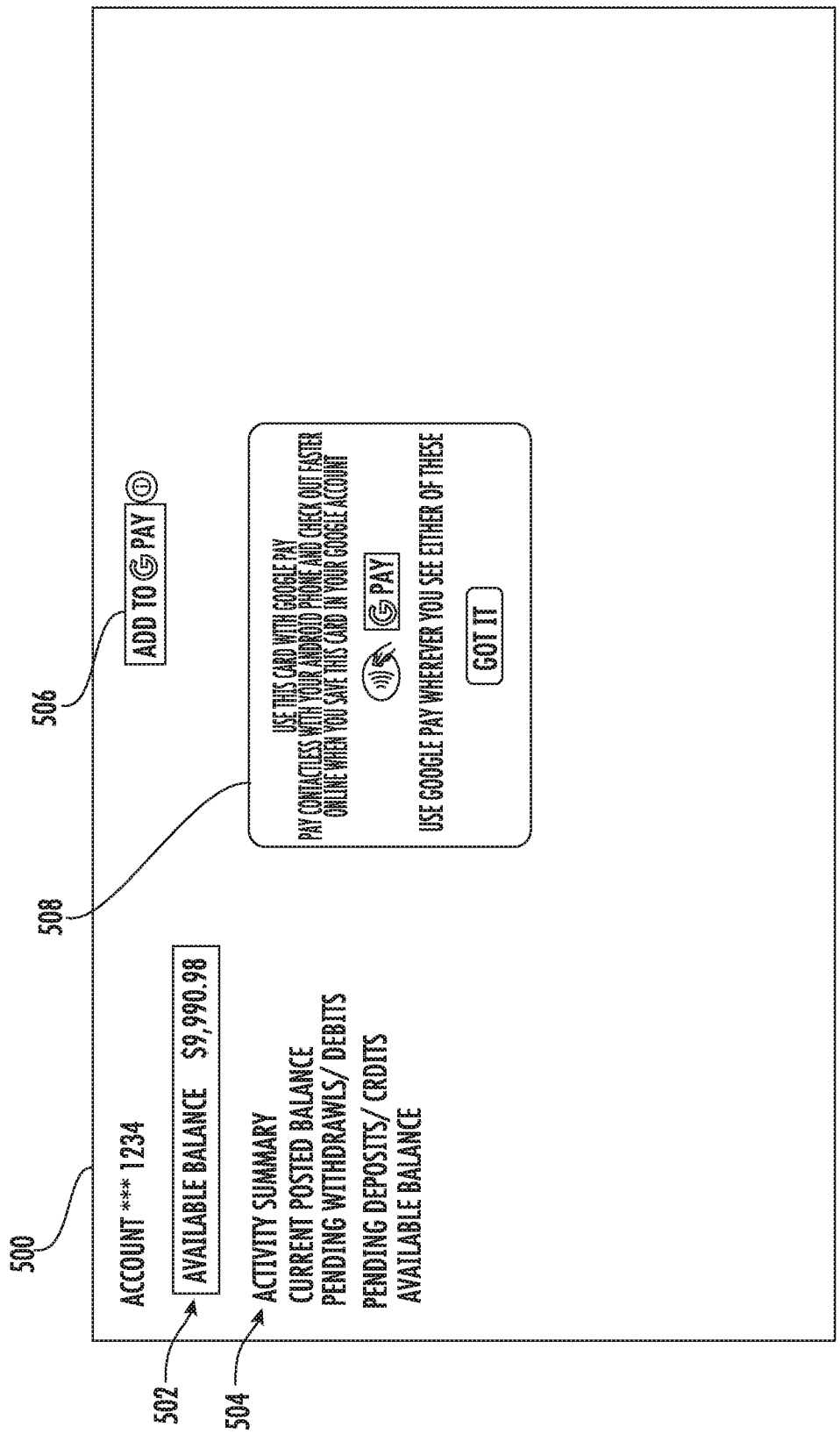

FIGS. 5 through 8 depict a series of sequential views 500, 600, 700, 800 of a user interface of the computing device in which data describing an electronic credential can be received by one or more APIs according to the present disclosure. Referring to FIG. 5, banking information 502, 504 can be displayed based on data received from a banking website via a web browser application or by a banking application. The computing system can display an interactive object 506 in the user interface 500. For example, the interactive object 506 can offer to save an electronic credential for later use. The electronic credential can be or include a debit card or credit card corresponding with the banking information 502 being displayed.

The computing system can display a window or panel 508 offering for the electronic credential to been saved for later use in a local memory location and/or with the digital wallet service. The electronic credential can be or include a debit card or credit card corresponding with the banking information 502 being displayed. For instance, the panel 506 can include text such as "Use this card with [digital wallet service provider]."

Figure 6:
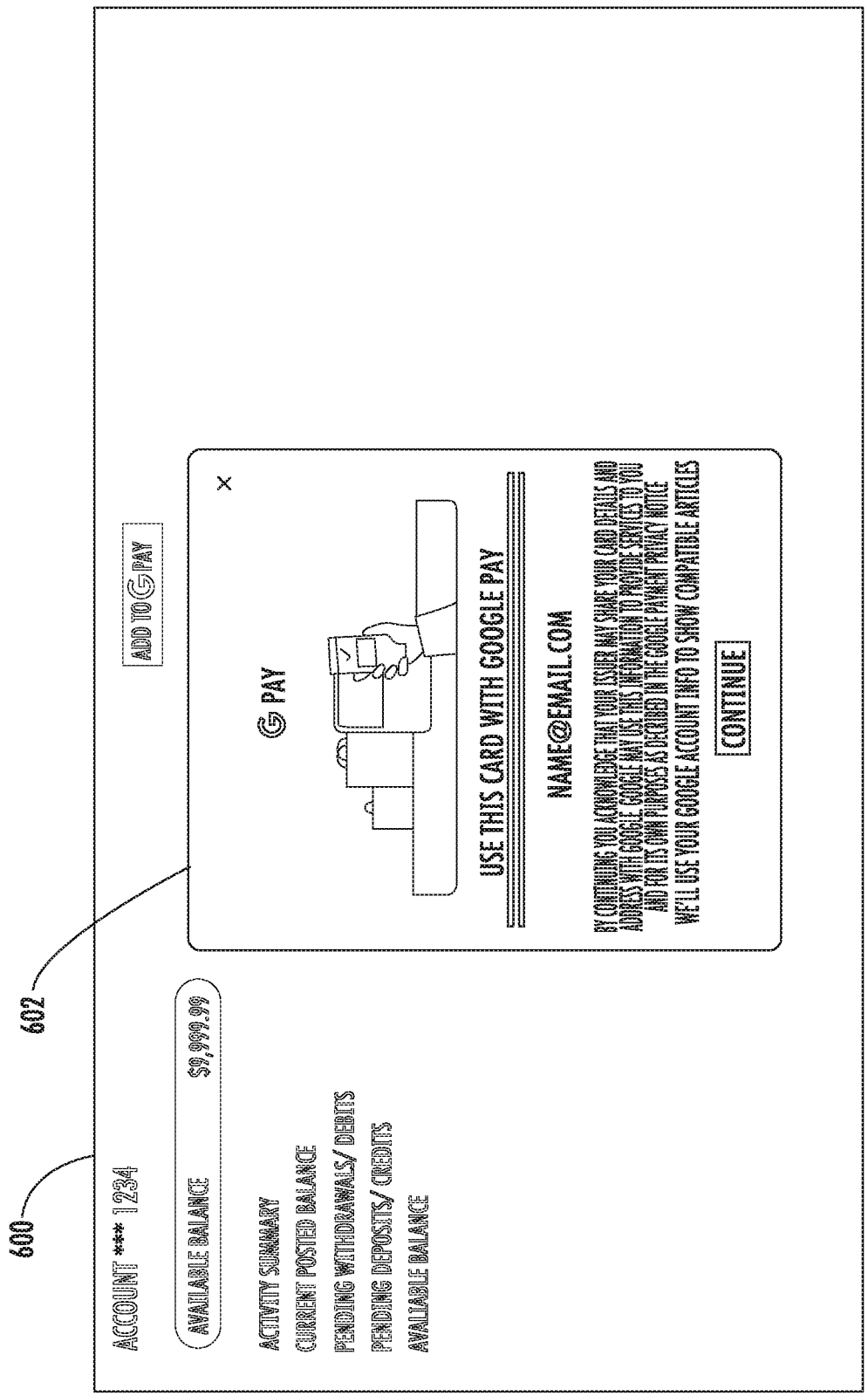

Referring to FIG. 6, in some implementations, additional steps may be required to save the electronic credential for later use. The additional steps may be configured to verify the user's identify and/or provide increased security. For instance, a panel 602 may be displayed in the user interface 600. The panel 602 may facilitate logging into a user account with a provider of the digital wallet service.

Figure 7:
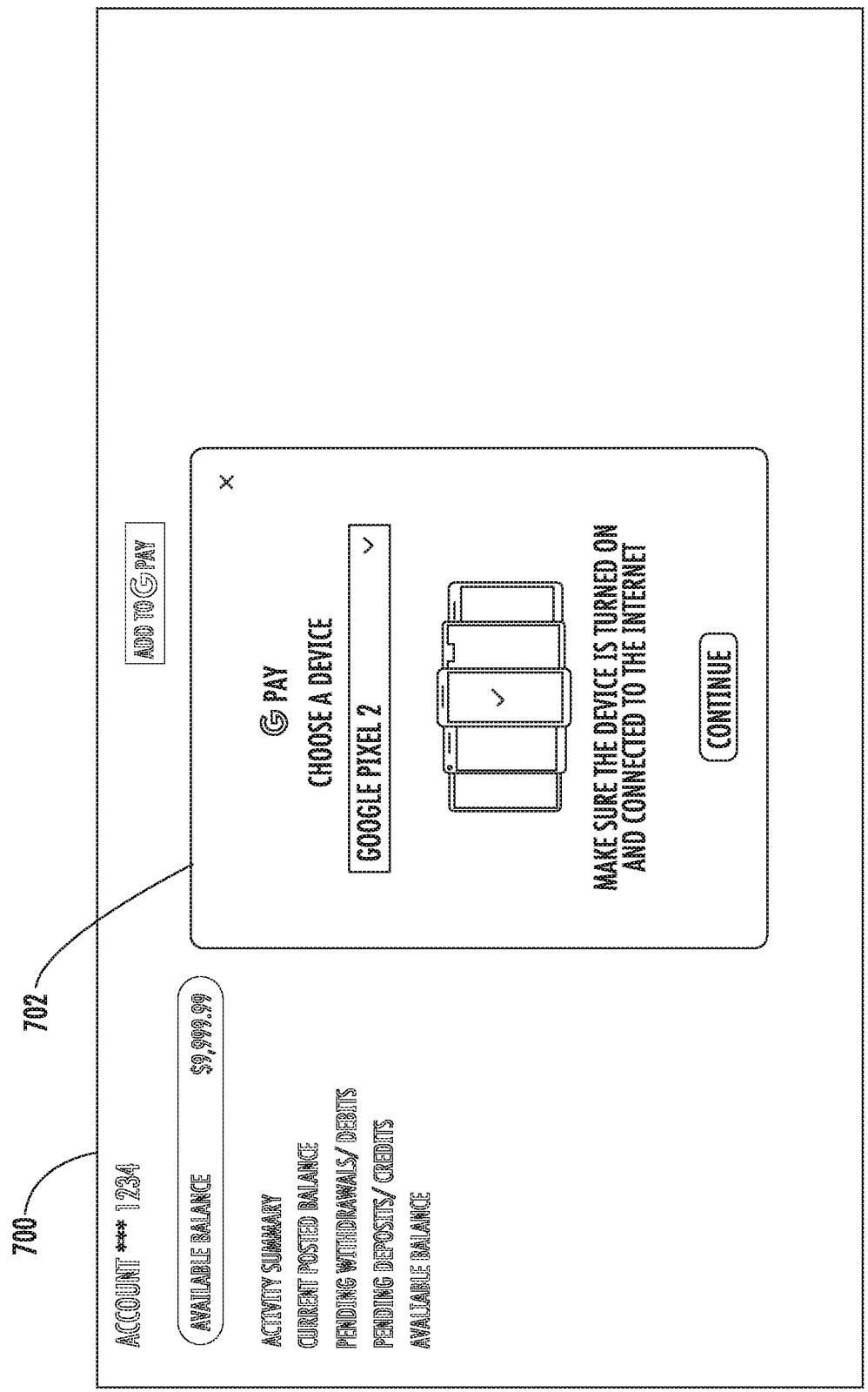

Referring to FIG. 7, a panel 702 may be displayed in the user interface 700 offering the user a selection of various devices (e.g., mobile devices) with which to receive the electronic credential and/or data describing the electronic credential. For instance, the user can select a particular mobile device (e.g., smartphone, tablet, etc.) to receive the electronic credential and/or data describing the electronic credential.

Figure 8:
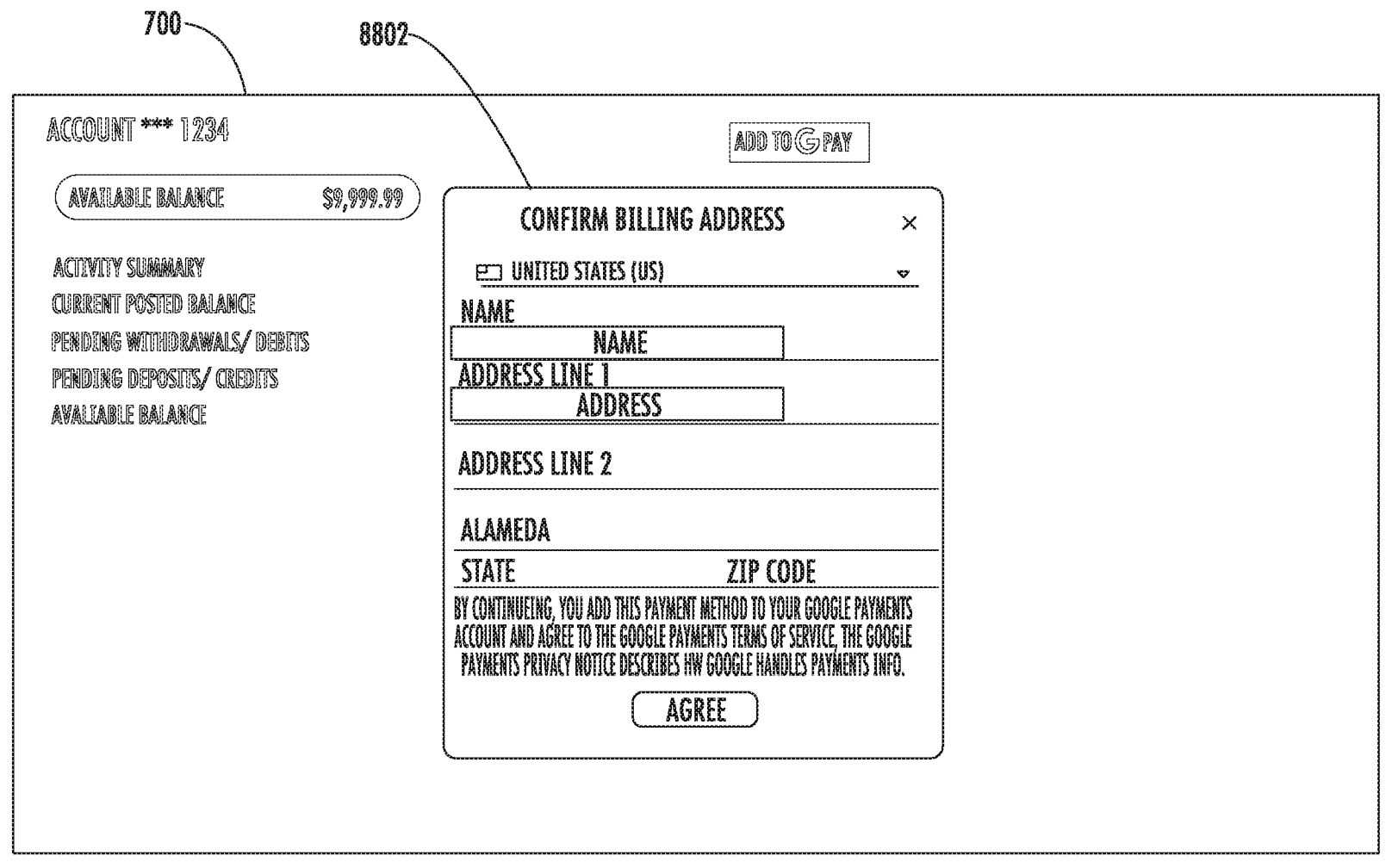

Referring to FIG. 8, in some implementations, the user may be asked to confirm information about the electronic credential (e.g., to verify the user's identity). For example, a panel 802 can be displayed in the user interface 800 in which the user can enter a billing address or other information associated with user and/or electronic credential. It should be understood, that each of the additional steps described above with reference to FIGS. 6 through 8 may be omitted or substituted for other additional steps within the scope of this disclosure.

Figure 9:
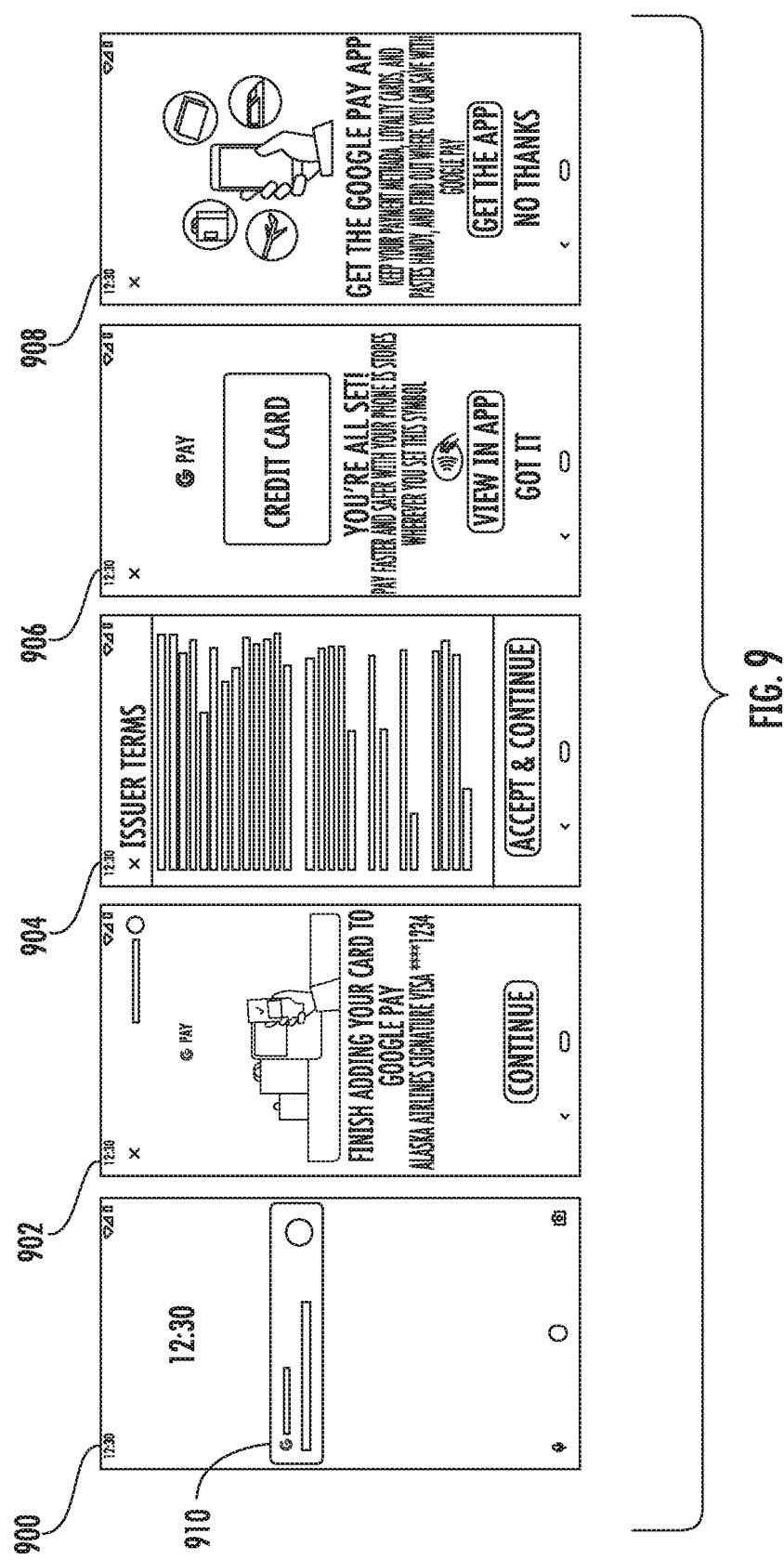
FIG. 9 illustrates a series of sequential views of a user interface in which a user can confirm receipt and/or complete setup of an electronic credential or data describing the electronic credential on a mobile device according to aspects of the present disclosure.

FIG. 9 illustrates a series of sequential views 900, 902, 904, 906, 908 of a user interface in which a user can confirm receipt and/or complete setup of an electronic credential or data describing the electronic credential on a mobile device. For example, the steps described above with reference to FIGS. 5 through 8 may be used to request that the electronic credential be sent and/or initiate a process of setting up an electronic credential for use on a mobile computing device. Thereafter, the steps described with reference to FIG. 9 may be used to complete the process and/or confirm that the electronic credential and/or data describing the electronic credential should be sent to the mobile computing device. The mobile computing device of FIG. 9 (e.g., a smartphone) can be different and distinct from the computing device of FIGS. 5 through 8 (e.g., a laptop or desktop computer). It should be understood, however, that the steps described with reference to FIGS. 5 through 8 can be used separately from the steps described with reference to FIG. 9. Further, any suitable method may be used for requesting the electronic credential or data describing the electronic credential to the mobile computing device (e.g., in place of the steps described above with reference to FIGS. 5 through 8). Additionally, in some embodiments, the steps of FIGS. 5 to 8 can be used without the steps of FIG. 9.

A notification 910 can be displayed in the user interface in the first view 900. The notification 910 can provide the option to complete the process of adding the electronic credential to the digital wallet service. Next, the second view 902 of the user interface can provide the user with an option to continue the process. The third view 904 of the user interface can provide the user with terms and conditions. The fourth view 906 can confirm that the electronic credential is setup and ready to use from the digital wallet service and offer the user with an option to view a application or operating-system layer can be configured to provide a digital wallet interface for accessing and/or organizing electronic credentials, for example as described below with reference to FIGS. 14 through 17. Alternatively, the fifth view 908 of the user interface can provide the user with an option to download the computer application that is configured to facilitate the use of the electronic credential.

Figure 10:
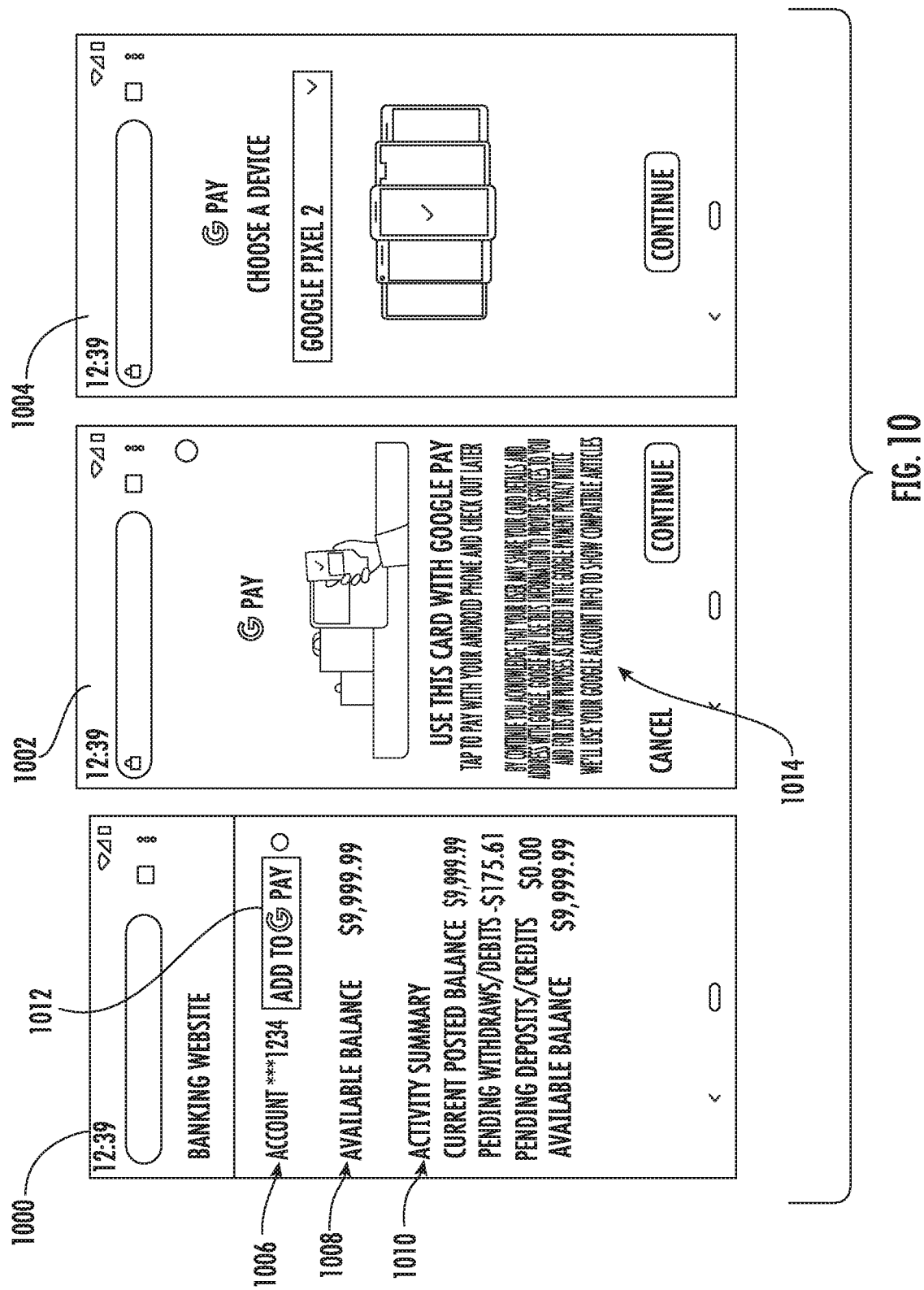
FIG. 10 illustrates a series of sequential views of a user interface of a mobile computing device, in which the user can receive and setup an electronic credential with a single computing device according to aspects of the present disclosure.

FIG. 10 illustrates a series of sequential views 1000, 1002, 1004 of a user interface of a mobile computing device, in which the user can receive and setup an electronic credential with a single computing device. The steps described with reference to FIG. 10 can be performed without use of a second computing device. Referring to the first view 1000 of the user interface, banking information 1006, 1008, 1010 can be displayed based on data received from a banking website via a web browser application. An interactive object 1012 can be displayed in the first view 1000 of the user interface. The interactive object 1012 can offer to store the electronic credential (e.g., credit card, debit card) to a local memory location and/or with the digital wallet service.

In response to a user input action requesting that the electronic credential be stored, the second view 1002 can be displayed that provides the user with additional information 1014 (e.g., terms, conditions, disclaimers, etc.).

Lastly, in the third view 1004 of the user interface, the user can optionally be provided with an option to select a computing device (e.g., a different computing device than the current computing device) for storing the electronic credential. The electronic credential and/or data describing the electronic credential can stored in the local memory location of the current mobile computing device and/or by the digital wallet service. However, in some implementations, the steps described with reference to the third view 1004 can be omitted.

Figure 11:
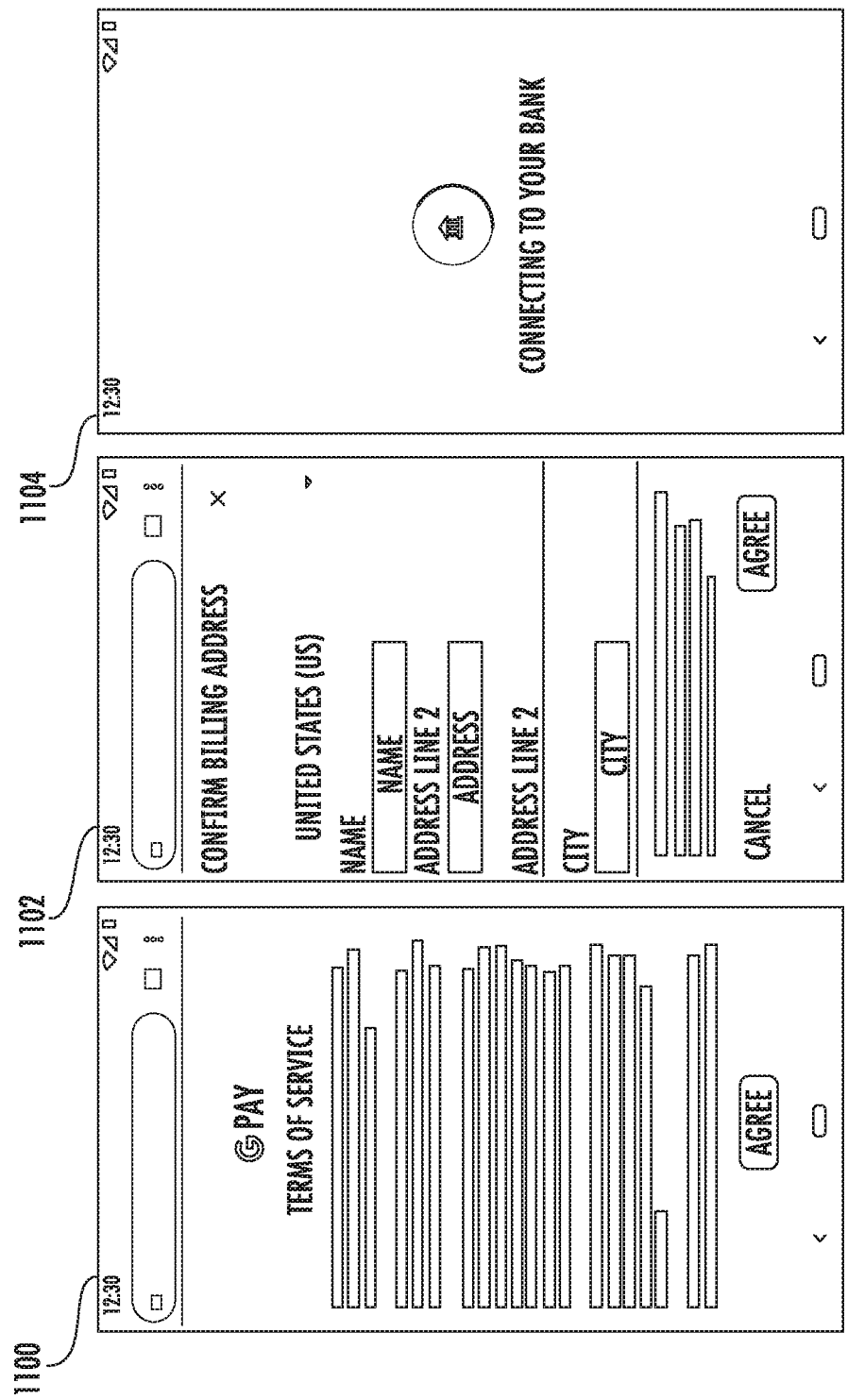
FIG. 11 illustrates a series of sequential views of a user interface of a mobile computing device in which additional steps and/or notifications that may be employed to store an electronic credential for later use according to aspects of the present disclosure.

FIG. 11 depicts views 1100, 1102, 1104 of additional steps and/or notifications that may be employed to save the electronic credential for later use. For example, the first view 1100 of the user interface can present the user with terms of service. The second view 1102 can allow the user to enter information associated with the user and/or electronic credential, for example to confirm the user's identify and/or provide increased security. The third view 1104 can provide the user with a confirmation that the electronic credential is being transmitted to the user's computing device (e.g., directly from the user's bank).

The electronic credential can be or include payment devices and/or accounts, such as credit cards, debit cards, bank accounts or the like. Additionally, the electronic credentials can be or include passes, membership rewards cards, transit cards, and/or any other suitable electronic credentials. Additional example electronic credentials are described below with reference to FIGS. 12 and 13.

Figure 12:
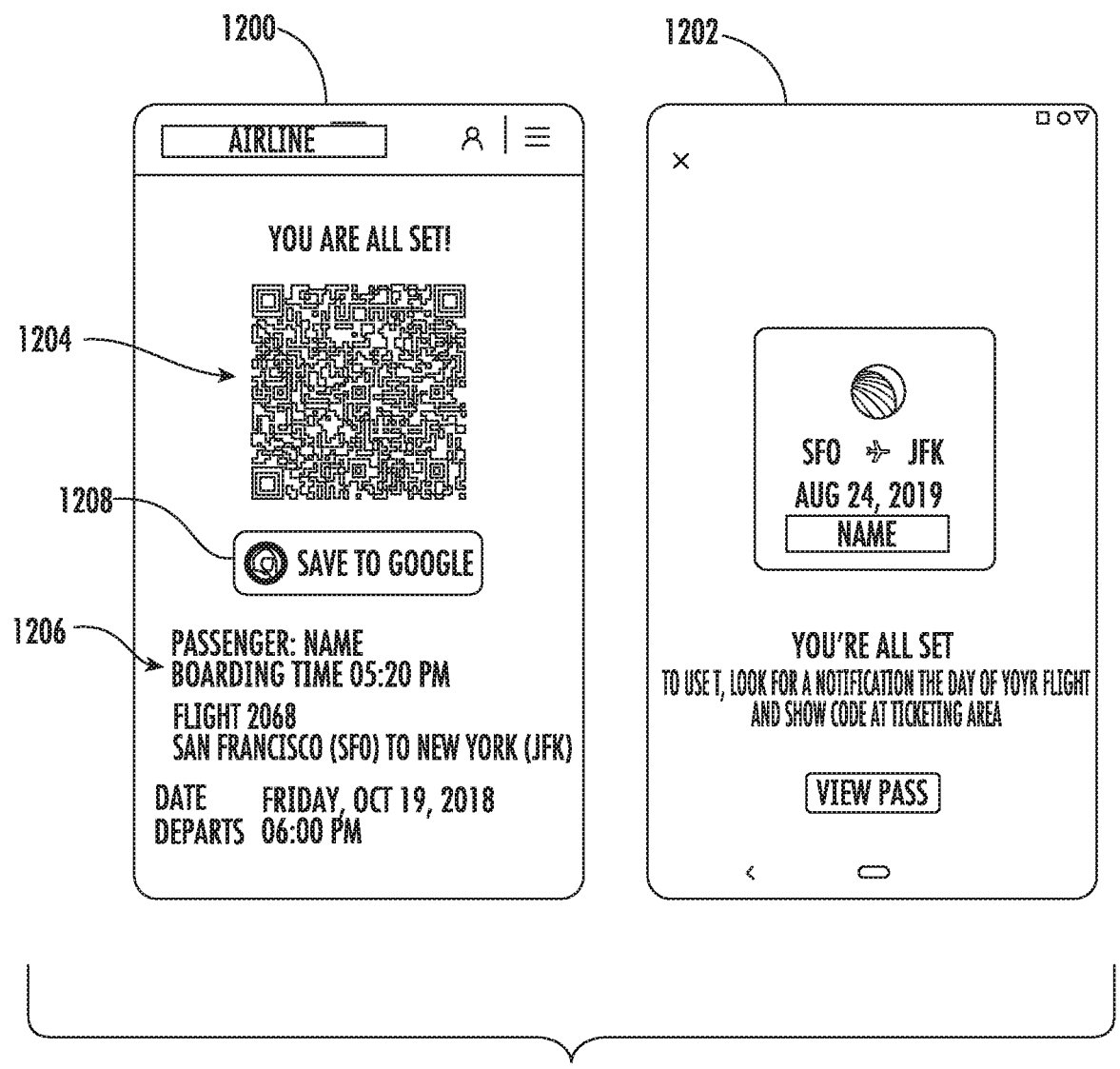
FIG. 12 illustrates a series of sequential views of a user interface of a mobile computing device in which the electronic credential corresponds with a boarding pass according to aspects of the present disclosure.

FIG. 12 depicts views 1200, 1202 of a user interface of computing device in which the electronic credential corresponds with a boarding pass. For example, in the first view 1200 of the user interface, information received from a travel application (e.g., an airline application) is displayed. For example, a QR code 1204 and/or other information 1206 can be displayed in the first view 1200 of the user interface.

An interactive object 1208 can be displayed that offers to store the boarding pass and/or data describing the boarding pass.

A user input can be detected that request storing the electronic credential. For instance, the user can tap or otherwise engage with the interactive object 1208. In response to detecting the user input, the second view 1202 of the user interface can be displayed. The second view 1202 of the user interface can confirm that electronic credential is stored in the digital wallet service and/or at a local memory location of the mobile computing device for later use.

One or more of the above functions can be performed or facilitated through one or more APIs. For example, the data that describes the electronic credential can be received from the application and/or from a source that is distinct from the application via one or more APIs. The data can include an encrypted version of the electronic credential and/or other information about the electronic credential (e.g., the QR code 1204 or other information 1206). As another example, display of the interactive object 1208 can be facilitated via one or more APIs.

Figure 13:
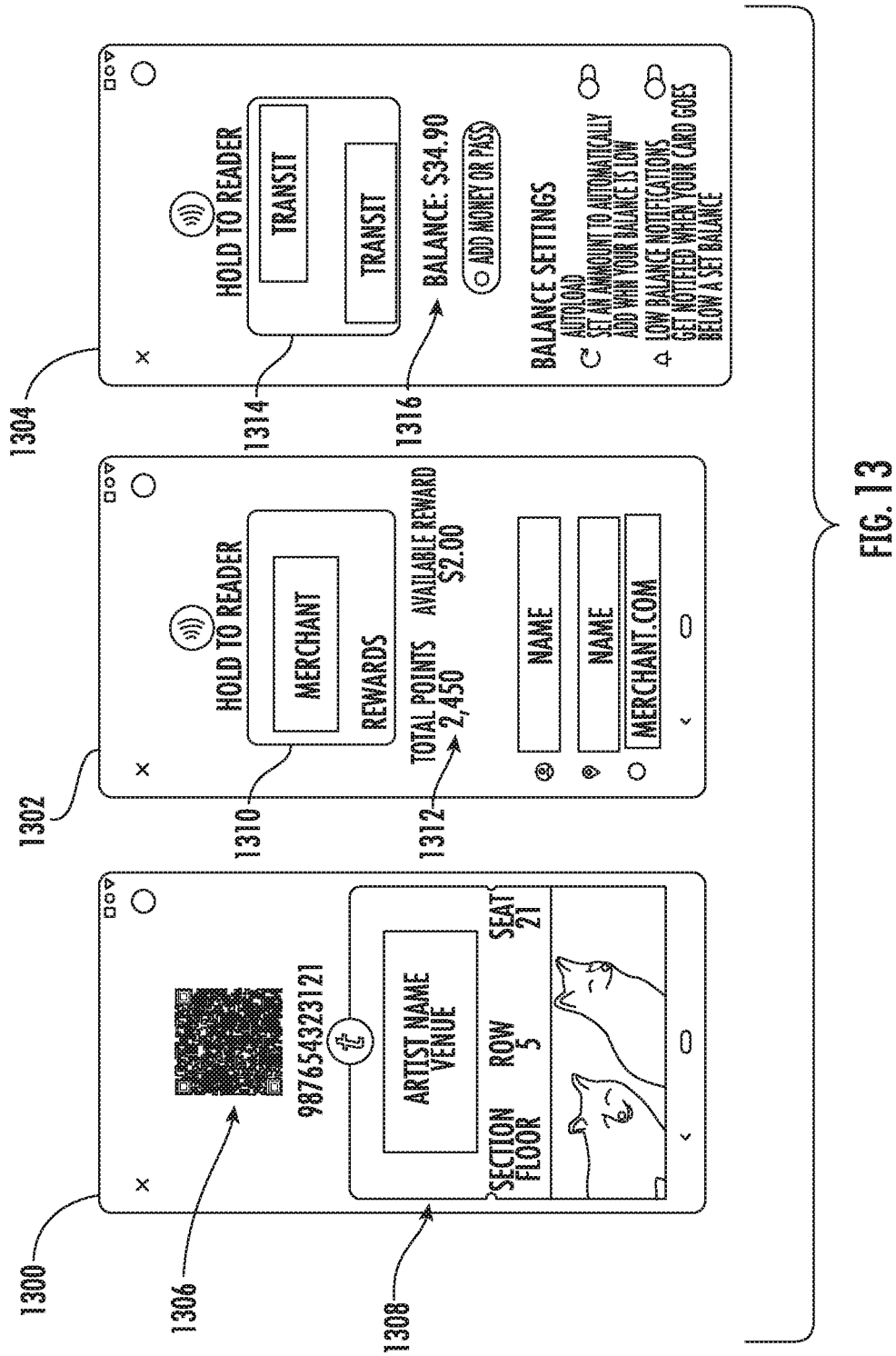
FIG. 13 illustrates a series of sequential views of a user interface of a mobile computing device in which data describing different example electronic credentials is displayed according to aspects of the present disclosure.

FIG. 13 depicts three views 1300, 1302, 1304 of user interfaces in which data describing different example electronic credentials is displayed. In the first view 1300, a QR code 1306 and/or additional information 1308 can be displayed that described a concert ticket. In the second view 1302 a rewards card 1310 and/or information 1312 associated with the rewards card 1310 can be displayed. In the third view 1304, a transit card 1314 and/or additional information 1316 associated with the transit card 1314 can be displayed. The above electronic credentials can be stored in response to a user input requesting that the electronic credentials be stored.

Electronic credentials can be stored in response to a variety of user input. For example, as described above, electronic credentials and/or data describing the electronic credentials can be stored in response to a user input directed to an interactive button to a touch sensitive display screen. However, the electronic credentials can be stored in response to other input. For instance, a physical button or combination of physical buttons on the mobile device can be configured to store one or more electronic credentials. As another example, electronic credentials can be stored in response to a voice command.

In other implementations, electronic credentials can be stored automatically, if the user has so consented. For example, a user can consent to particular types of electronic credentials being automatically detected and/or stored. As the user accesses or obtains new electronic credentials, the new electronic credentials can be automatically stored with the digital wallet service. For example, a user can apply for a new credit card and install a new banking application for the new credit card. If the user has so consented, when the user logs into the new banking application, the computing system can automatically store the credit card and/or a tokenization of the credit card for later use by the user.

Furthermore, although described above as performed with one or more APIs, in some implementations, electronic credentials and/or data describing the electronic credentials can be stored without APIs or other integration of application providing the electronic credential. For example, the computing system can employ an operating system layer that is configured to identify electronic credentials that are suitable for storage in the digital wallet service. When such credentials are detected (e.g., as displayed in the user interface and/or as assessible through a computing application), the operating system layer can be configured to identify the electronic credential. The computing system can be configured to notify the user that the electronic credential is available for storage, for example, with an interactive object as described above. However, in other implementations, the operating system layer can be configured to automatically store the electronic credential(s) as described above.

Figure 14:
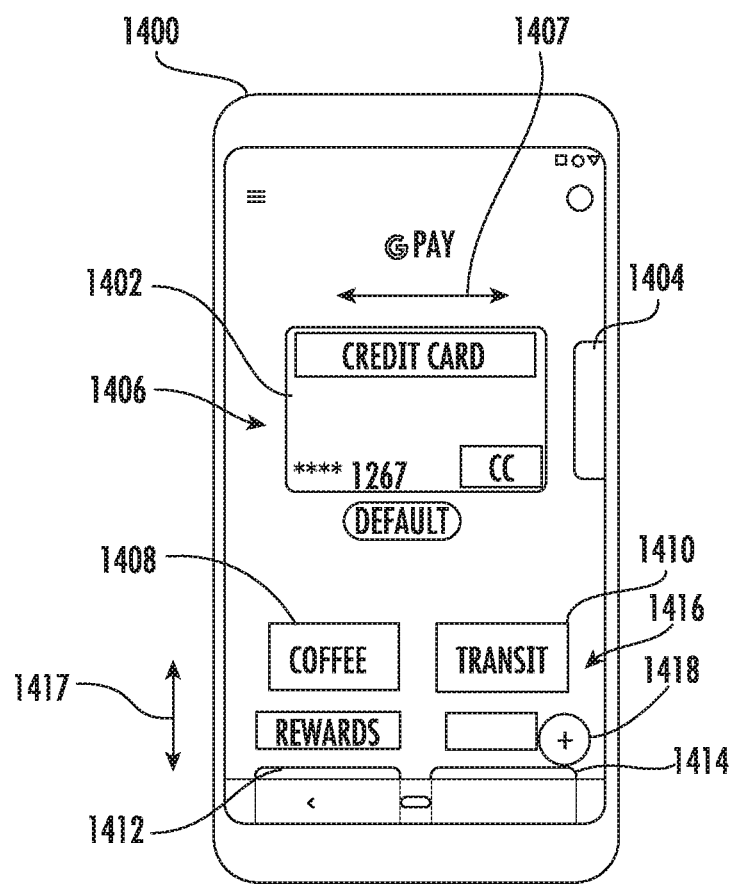
FIG. 14 illustrates a series of sequential views of a user interface including an application or operating-system layer that is configured to provide a digital wallet interface for accessing and/or organizing electronic credentials according to aspects of the present disclosure.

FIG. 14 depicts a user interface 1400 depicting an application or operating-system layer can be configured to provide a digital wallet interface for accessing and/or organizing electronic credentials. The electronic credentials can be automatically organized, for example by type. One or more financial electronic credentials 1402, 1404 (e.g., credit cards, debit cards, etc.) can be displayed in a first panel 1406. The first panel 1406 can be scrollable in a first direction 1407 to display additional financial electronic credentials. Other types of electronic credentials 1408, 1410, 1412, 1414 such as rewards, loyalty, and/or transit cards can be displayed in a second panel 1416. The second panel 1416 can be scrollable in a second direction 1417. In some embodiments, the second direction 1417 can be perpendicular with the first direction 1407.

Additionally, the digital wallet interface can include an "add" button 1418 for adding additional electronic credentials to the digital wallet service. The "add" button 1418 can provide the user with an option to manually import a credential (e.g., credit card, debit card, rewards card or the like), for example by manually entering information associated with the credential.

Figure 15:
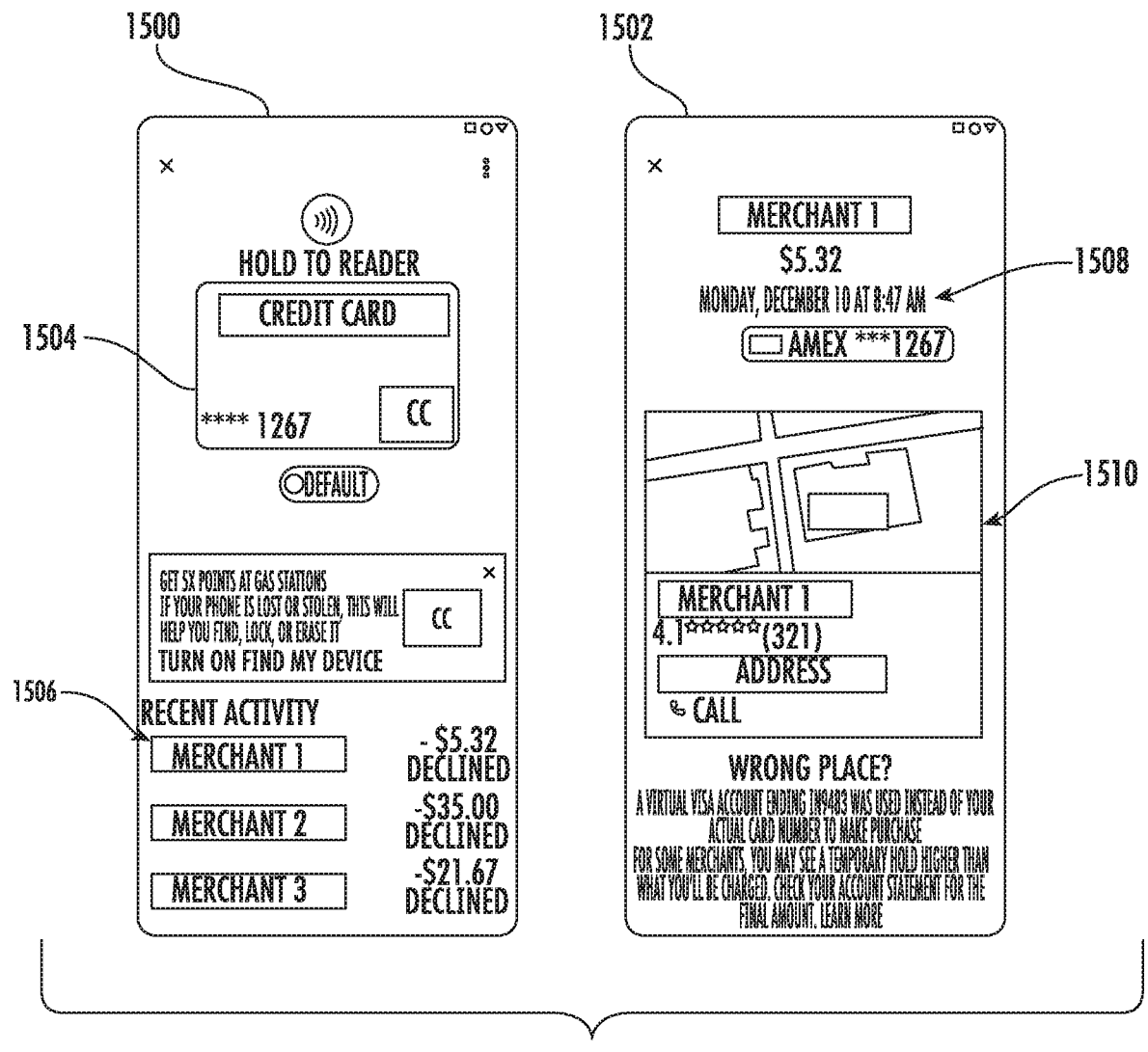
FIG. 15 illustrates a series of sequential views of a user interface depicting an application or operating-system layer that can be configured to provide the digital wallet interface for accessing and/or organizing electronic credentials according to aspects of the present disclosure.

FIG. 15 depicts two additional views 1500, 1502 of user interfaces depicting an application or operating-system layer can be configured to provide the digital wallet interface for accessing and/or organizing electronic credentials. For example, referring to the first view 1500, the operating-system layer can be configured to display a particular electronic credential 1504 and details associated with the electronic credential 1504 such as recent transactions 1506 or other details. The computing device can be configured to display the first view 1500 of FIG. 15 in response to a user selecting the electronic credential 1402 in the view 1400 of the user interface of FIG. 14.

The second view 1502 of the user interface can include additional details 1508, 1510 about a particular transaction 1506. For example, the second view 1502 can be displayed in response to the user selecting the particular transaction 1506. The additional details 1508, 1510 can include, for example, a day and time 1508 of the transaction 1506 and/or a location 1510 of the transaction. Thus, the digital wallet interface can be configured to selectively provide the user with additional information about particular electronic credentials and/or past uses (e.g., transactions) of the electronic credentials.

Figure 16:
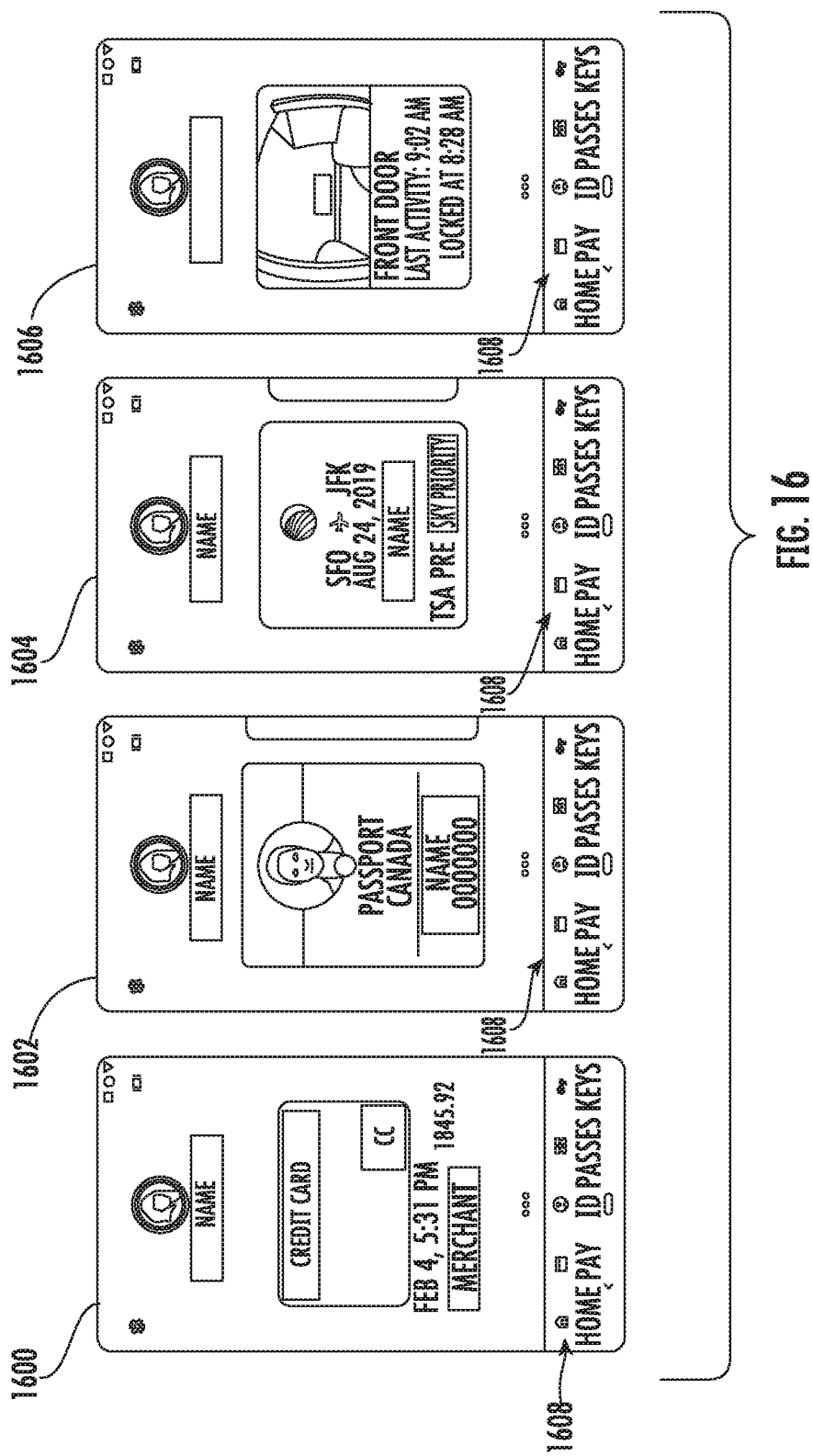
FIG. 16 illustrates a series of sequential views of a user interface including an application or operating-system layer that can be configured to provide categories for electronic credentials in a digital wallet interface for accessing and/or organizing electronic credentials according to aspects of the present disclosure.

FIG. 16 depicts a series of views 1600, 1602, 1604, 1606 of user interfaces depicting an application or operating-system layer can be configured to provide the digital wallet interface for accessing and/or organizing electronic credentials. The user interfaces 1600, 1602, 1604, 1606 can include a navigation bar 1608. The navigation bar 1608 can provide categories of electronic credentials. Example categories include "Pay," "ID," "Passes," and "Keys." The user can navigate between respective categories of electronic credentials using the navigation bar 1608. Electronic payment credentials, such as credit cards, debit cards, and the like can be accessed in the "Pay" page illustrated in the first view 1600. Identification cards, such as passports, driver's licenses, and the like, can be accessed in the "ID" category, for example as illustrated in the second view 1602. Boarding passes, tickets, and the like can be accessed in the "Passes" category, for example as illustrated in the third view 1604. Lastly, one or more electronic keys, security videos and/or live streams, and/or other home-based security credentials and/or items can be accessed in the "Keys" category.

Aspects of the present disclosure are directed to providing the user with introductory information (e.g., "onboarding" information) and/or the ability to easily setup their mobile device for use with the digital wallet service. For example, the computing system can prompt the user to adjust settings (e.g., turn on near field communication (NFC), Bluetooth) and/or adjust permissions to facilitate use of electronic credentials.

Figure 17:
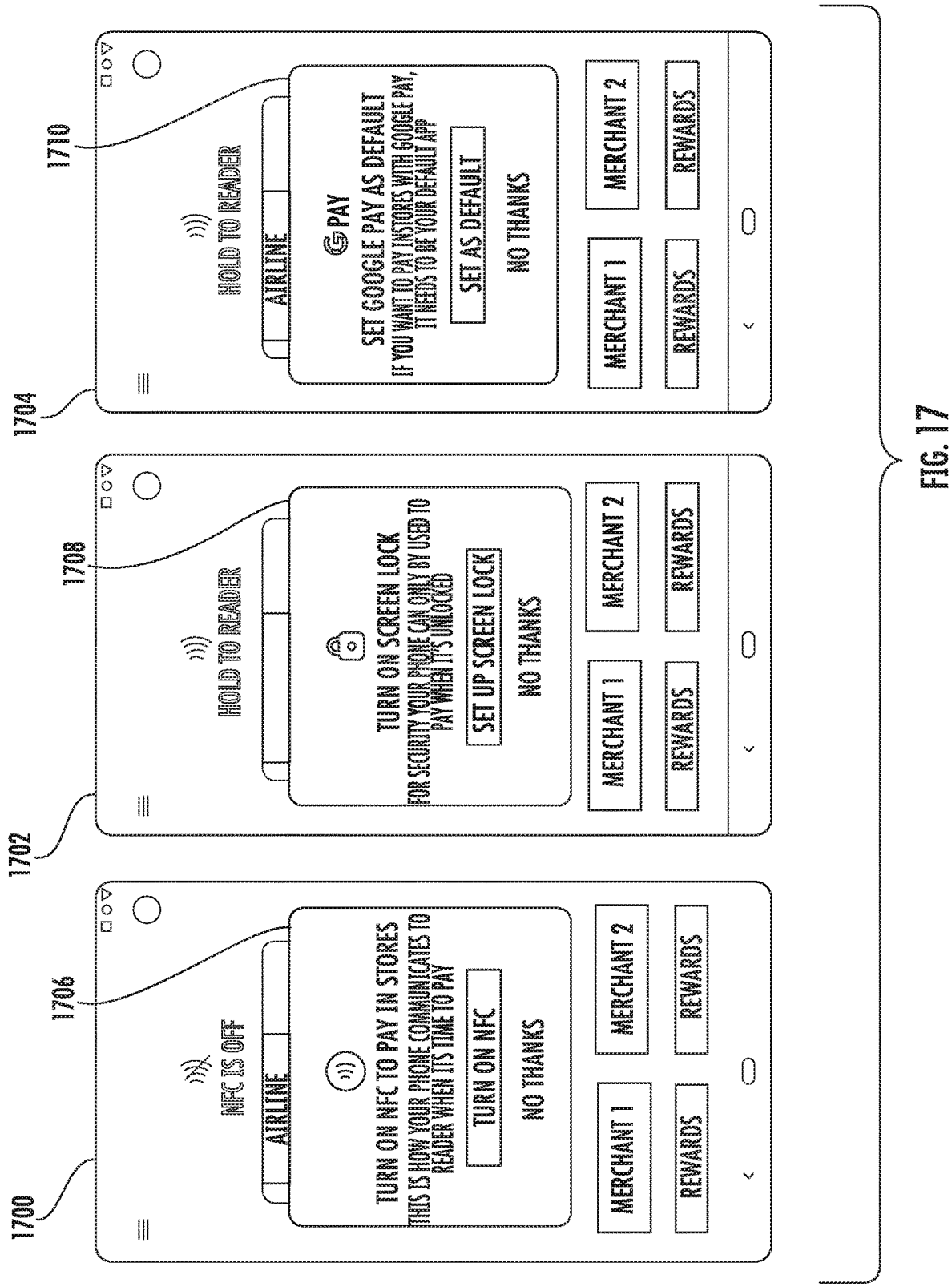
FIG. 17 illustrates a series of sequential views of a user interface displaying example prompts or notifications that can be presented to users by the digital wallet interface according to aspects of the present disclosure.

For example, FIG. 17 depicts several views 1700, 1702, 1704 of prompts or notifications that can be presented to users. Referring to the first view 1700, the computing system can prompt the user in a first display panel 1706 to adjust one or more settings. In this example, the panel 1706 prompts the user to turn on NFC, for example to facilitate use of tokenized credit cards and/or debit cards to make purchases. As another example, referring to the second view 1702, the computing device can prompt the user in a second display panel 1708 to adjust a setting with respect to the locking the screen of the mobile computing device. For instance, the electronic payment devices can only be used when the screen of the device is unlocked to improve security. Referring to the third view 1704, a third display panel 1710 can be displayed that prompts the user to set the digital wallet service application as the user's default payment method. The various prompts and/or notifications described herein can also be used to educate and inform the user about the digital wallet service.

Example Methods

Figure 18:
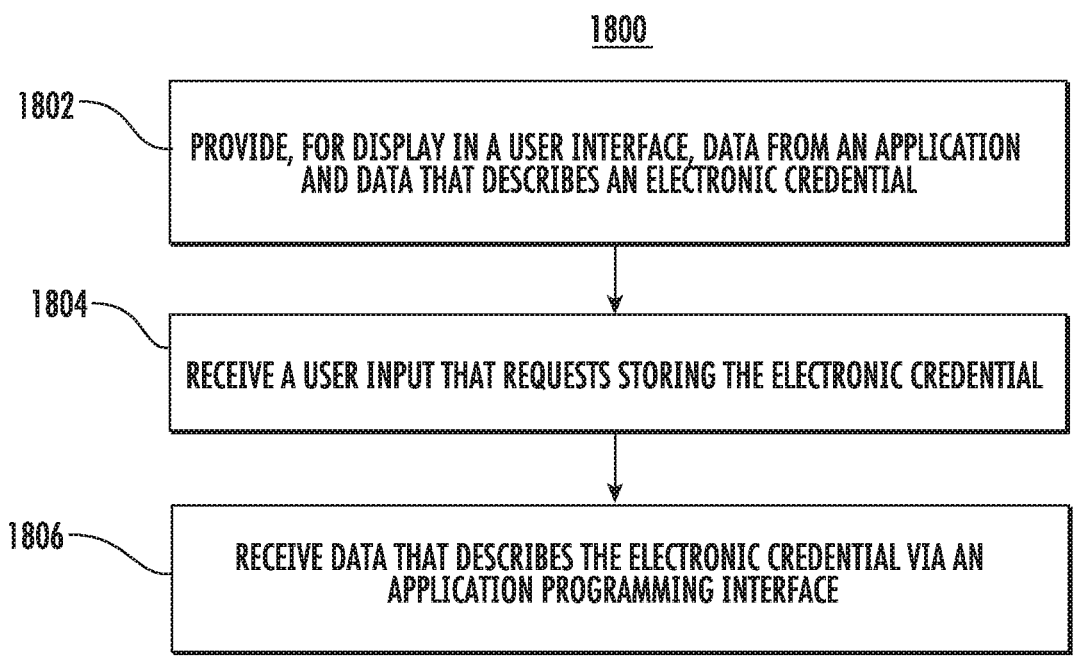
FIG. 18 depicts a flow chart diagram of an example method for receiving data describing an electronic credential according to aspects of the present disclosure.

FIG. 18 depicts a flow chart diagram of an example method for receiving data describing an electronic credential. Although FIG. 18 depicts steps performed in a particular order for purposes of illustration and discussion, the methods of the present disclosure are not limited to the particularly illustrated order or arrangement. The various steps of the method 1800 can be omitted, rearranged, combined, and/or adapted in various ways without deviating from the scope of the present disclosure.

At 1802, a computing system can be configured to provide, for display in a user interface, data from an application and data that describes an electronic credential. For example, a mobile computing device can display a display window of a banking application and an electronic credential that includes or describes a credit card in the display window of the mobile banking application, for example as described above with reference to FIG. 2. As another example, the computing device can display an electronic credential that includes or describes a credit card in a display window of a web browser application. The computing device can be or include a mobile computing device, for example as described above with reference to FIG. 10. Alternatively, the computing device can be or include a desktop or laptop computer, for example as described above with reference to FIGS. 5 through 8.

At 1804, the computing system can be configured to receive a user input that requests storing the electronic credential. For example, the user can provide a user touch input directed to an interactive object (e.g., button, slider, etc.) that offers to store the electronic credential, for example as described above with reference to FIG. 2 or click on a button for example as described above with reference to FIG. 5. Additionally or alternatively, a physical button or combination of physical buttons on the mobile device can be configured to request storing of one or more electronic credentials. For instance, the credential can be stored in response to the user taking a screenshot of the electronic credential. As another example, the user can request storing of the electronic credentials by voice command. In some implementations, the interactive object can be displayed through one or more APIs that have been integrated into the application.

At 1806, the computing system can be configured to receive data that describes the electronic credential via an application programming interface. For example, in response to user tapping the interactive object, the application can transmit the electronic credential and/or data that describes the electronic credential to the mobile device. As another example, the application can facilitate or request transmission of the electronic credential and/or data that describes the electronic credential from a source that is distinct from the application (e.g., a banking server). Aspects of the transmission, formatting, and/or reception may be defined according to the API(s) and/or facilitated by the API(s). For instance, the application or a third party service (e.g., Visa, Mastercard, etc.) can tokenize a credit card and transmit the tokenized credit card to the mobile computing device according to the API and/or in response to the user input that requests the same. The computing system can facilitate reception of the tokenized version of the credit card according to the API(s).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, comprising;
   at least one processor;
   a user interface;
   at least one tangible, non-transitory computer-readable medium that stores instructions that, when executed by the at least one processor, cause the at least one processor to perform operations, the operations comprising:

displaying, in the user interface , user data;

determining that the user data includes electronic credential data;

based on the determination that the user data includes electronic credential data, updating the user interface by including a store credential data interface element in the displayed user interface;

receiving a user input on the store credential data interface element;

based on receipt of the user input on the store credential data interface element:

accessing the electronic credential data from the user interface; and storing the electronic credential data from the user interface in a digital wallet.

2. The computing system of claim 1, wherein the store credential data interface element is an interactive object.

3. The computing system of claim 1, wherein the electronic credential data comprises a credit card or debit card.

4. The computing system of claim 3, wherein the electronic credential data comprises a tokenization of the credit card or the debit card.

5. The computing system of claim 1, wherein the electronic credential data comprises at least one of a pass or a ticket.

6. The computing system of claim 1, wherein the electronic credential data is accessed by receiving the data via an application programming interface at the computing system.

7. The computing system of claim 1, wherein the user interface is associated with a web browser application.

8. The computing system of claim 1, wherein the user interface is associated with a mobile banking application.

9. A method for receiving data describing an electronic credential, the method comprising:

displaying, in a user interface of a computing device, user data;

determining, by the computing device, that the user data includes electronic credential data;

based on determining that the user data includes electronic credential data, updating, by the computing device, the user interface by including a store credential data interface element in the displayed user interface;

receiving, by the computing device, a user input on the store credential data interface element;

based on receipt of the user input on the store credential data interface element, accessing, by the computing device, via an application programming interface, the electronic credential data from the user interface; and storing, by the computing device, the electronic credential data from the user interface in a digital wallet.

10. The method of claim 9 wherein the store credential data interface element is an interactive object.

11. The method of claim 9, wherein the electronic credential data comprises credit card data or debit card data.

12. The method of claim 11, wherein the electronic credential data comprises a tokenization of the credit card data or the debit card data.

13. The method of claim 9, wherein the electronic credential data comprises at least one of a pass or a ticket.

14. The method of claim 9, wherein the electronic credential data is accessed by receiving the data via an application programming interface at the computing device.

15. The method of claim 9, wherein the user interface is associated with a web browser application.

16. The method of claim 9, wherein the user interface is associated with a mobile banking application.

\* \* \* \* \*